United States Patent
Nakao (10) Patent No.: US 10,496,564 B2
(45) Date of Patent: Dec. 3, 2019

(54) BUS CONTROL CIRCUIT, INFORMATION PROCESSING APPARATUS, AND CONTROL METHOD FOR BUS CONTROL CIRCUIT

(71) Applicant: FUJITSU LIMITED, Kawasaki-shi, Kanagawa (JP)

(72) Inventor: Takashi Nakao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/880,044

(22) Filed: Jan. 25, 2018

(65) Prior Publication Data
US 2018/0217950 A1 Aug. 2, 2018

(30) Foreign Application Priority Data
Feb. 1, 2017 (JP) .................. 2017-016741

(51) Int. Cl.
*G06F 13/16* (2006.01)
(52) U.S. Cl.
CPC ...... *G06F 13/1642* (2013.01); *G06F 13/1673* (2013.01)
(58) Field of Classification Search
CPC ..... H04L 47/50; H04L 47/10; H04L 49/3045; H04L 49/101; H04L 12/5601; H04L 2012/5651; H04L 2012/5679; H04L 2012/5681; H04L 47/6215; H04L 49/90; H04L 49/1515; G06F 13/1642; G06F 3/0613; G06F 3/0659; G06F 3/0674; G06F 13/1663
USPC ........ 370/412, 235, 429, 230, 388; 710/243, 710/240, 53, 309, 52, 107, 120
See application file for complete search history.

(56) References Cited

U.S. PATENT DOCUMENTS

| | | | | |
|---|---|---|---|---|
| 5,901,295 A * | 5/1999 | Yazdy | ................... | G06F 13/362 710/113 |
| 6,671,275 B1 * | 12/2003 | Wong | ..................... | H04L 47/10 370/389 |
| 7,278,008 B1 * | 10/2007 | Case | ................... | G06F 12/1036 710/26 |
| 8,018,958 B1 * | 9/2011 | Johnson | .................. | H04L 47/32 370/401 |
| 2002/0181453 A1 * | 12/2002 | Norman | .................. | H04L 49/15 370/386 |

(Continued)

FOREIGN PATENT DOCUMENTS

JP 2002-252628 9/2002

*Primary Examiner* — Faisal M Zaman
(74) *Attorney, Agent, or Firm* — Fujitsu Patent Center (57) ABSTRACT

A bus control circuit includes: a plurality of queues that each include a plurality of entries for storing data, a first read pointer, and a check pointer set to indicate a same entry as an entry indicated by the first read pointer, and each store data on a First in, First out basis; a plurality of first arbitration circuits that receive, in a divided manner, arbitration participation signals from the plurality of queues, each arbitrate the received plurality of arbitration participation signals, and each output one of the plurality of arbitration participation signals; a plurality of buffers that each store, on the First in, First out basis, the arbitration participation signals output from the respective first arbitration circuits; and a second arbitration circuit that arbitrates the arbitration participation signals output from the plurality of buffers and outputs an arbitration result signal corresponding to one of the plurality of queues.

19 Claims, 10 Drawing Sheets

(56) References Cited

U.S. PATENT DOCUMENTS

| | | | |
|---|---|---|---|
| 2003/0021266 A1* | 1/2003 | Oki | H04L 12/5601 370/388 |
| 2004/0103232 A1* | 5/2004 | Clayton | G06F 13/364 710/244 |
| 2005/0135398 A1* | 6/2005 | Muthukrishnan | H04L 47/24 370/428 |
| 2007/0073949 A1* | 3/2007 | Fredrickson | G06F 13/362 710/243 |
| 2007/0133585 A1* | 6/2007 | Minkenberg | H04L 49/254 370/420 |
| 2007/0174529 A1* | 7/2007 | Rodriguez | G06F 13/362 710/240 |
| 2009/0037635 A1* | 2/2009 | Chou | G06F 13/36 710/309 |
| 2010/0191911 A1* | 7/2010 | Heddes | G06F 15/16 711/118 |
| 2010/0238949 A1* | 9/2010 | Passas | H04L 49/101 370/419 |
| 2013/0111165 A1* | 5/2013 | Ozawa | G06F 11/2089 711/162 |
| 2014/0281083 A1* | 9/2014 | Canepa | G06F 13/364 710/112 |
| 2014/0310437 A1* | 10/2014 | Saund | G06F 13/37 710/118 |

* cited by examiner

BUS CONTROL CIRCUIT, INFORMATION PROCESSING APPARATUS, AND CONTROL METHOD FOR BUS CONTROL CIRCUIT

CROSS-REFERENCE TO RELATED APPLICATION

This application is based upon and claims the benefit of priority of the prior Japanese Patent Application No. 2017-016741, filed on Feb. 1, 2017, the entire contents of which are incorporated herein by reference.

FIELD

The embodiments discussed herein are related to a bus control circuit, an information processing apparatus, and a control method for a bus control circuit.

BACKGROUND

A related art is disclosed in Japanese Laid-open Patent Publication No. 2002-252628.

SUMMARY

According to an aspect of the embodiments, a bus control circuit includes: a plurality of queues that each include a plurality of entries for storing data, a first read pointer, and a check pointer set to indicate a same entry as an entry indicated by the first read pointer, and each store data on a First in, First out basis; a plurality of first arbitration circuits that receive, in a divided manner, arbitration participation signals from the plurality of queues, each arbitrate the received plurality of arbitration participation signals, and each output one of the plurality of arbitration participation signals; a plurality of buffers that each store, on the First in, First out basis, the arbitration participation signals output from the respective first arbitration circuits; and a second arbitration circuit that arbitrates the arbitration participation signals output from the plurality of buffers and outputs an arbitration result signal corresponding to one of the plurality of queues.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

For example, a packet output arbitration device includes an output arbitration unit that outputs packets coming from a plurality of input lines into one output line. The output arbitration unit includes a plurality of packet schedule circuits that are multi-stage cascade-connected. One of the packet schedule circuits includes a plurality of buffers that store packets read from the input lines or paths of the packet schedule circuit in the previous stage. The plurality of buffers are categorized into groups of two or more buffers. The plurality of buffers each include a counter whose initial value is zero, a calculation unit, a selection unit, an addition unit, a reading unit, and a reset unit. The calculation unit calculates, for each of the plurality of buffers, a difference between a head packet length of the buffer and a counter value. The selection unit selects a buffer having a minimum value as a calculation result of the calculation unit. The addition unit adds the minimum value to the counter value of buffers other than the buffer having the minimum value as the calculation result. The reading unit reads the head packet stored in the buffer having the minimum value as the calculation result to an output line or the packet schedule circuit in the subsequent stage. The reset unit resets the counter value of the buffer whose head packet is read to zero.

For example, a bus control circuit is not optimized for a case where a packet is present only in a queue coupled to one of the plurality of input lines to each which queue is coupled. In such a case, the speed of a packet output from the output line is slow.

For example, a bus control circuit that read rapidly data stored in one of a plurality of queues in a case where data is stored only in the one of the plurality of queues may be provided.

Figure 1:
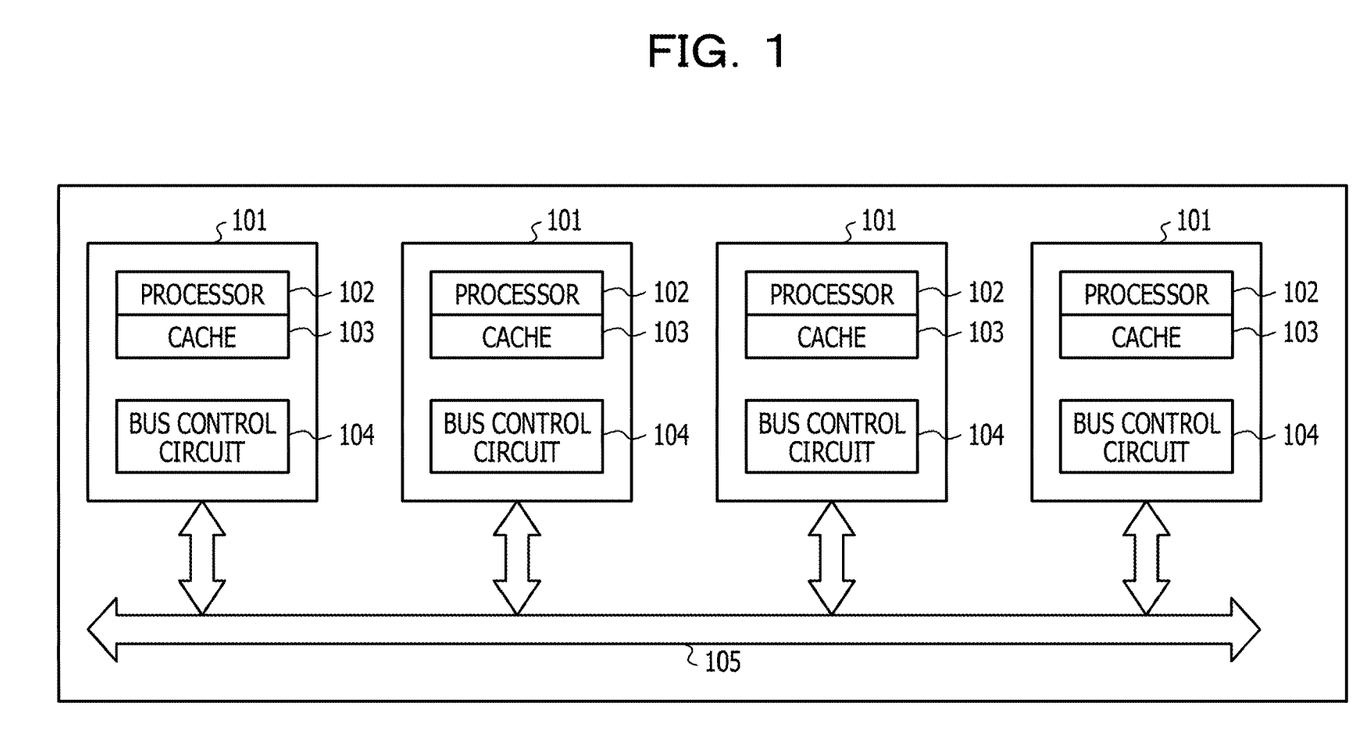
FIG. 1 illustrates an example of an information processing apparatus.

FIG. 1 illustrates an example of an information processing apparatus. An information processing apparatus 100 is, for example, a large scale integrated circuit (LSI), and includes a plurality of arithmetic processing devices 101 and a bus 105. The plurality of arithmetic processing devices 101 are coupled via the bus 105, and input and output packet data to and from one another. Each of the plurality of arithmetic processing devices 101 includes a processor 102, a cache 103, and a bus control circuit 104. The processor 102 reads packet data stored in the cache 103, and outputs the read packet data to the bus 105 via the bus control circuit 104. The plurality of arithmetic processing devices 101 transfer packet data to one another via the bus 105 to ensure cache coherency of the cache 103.

Figure 2:
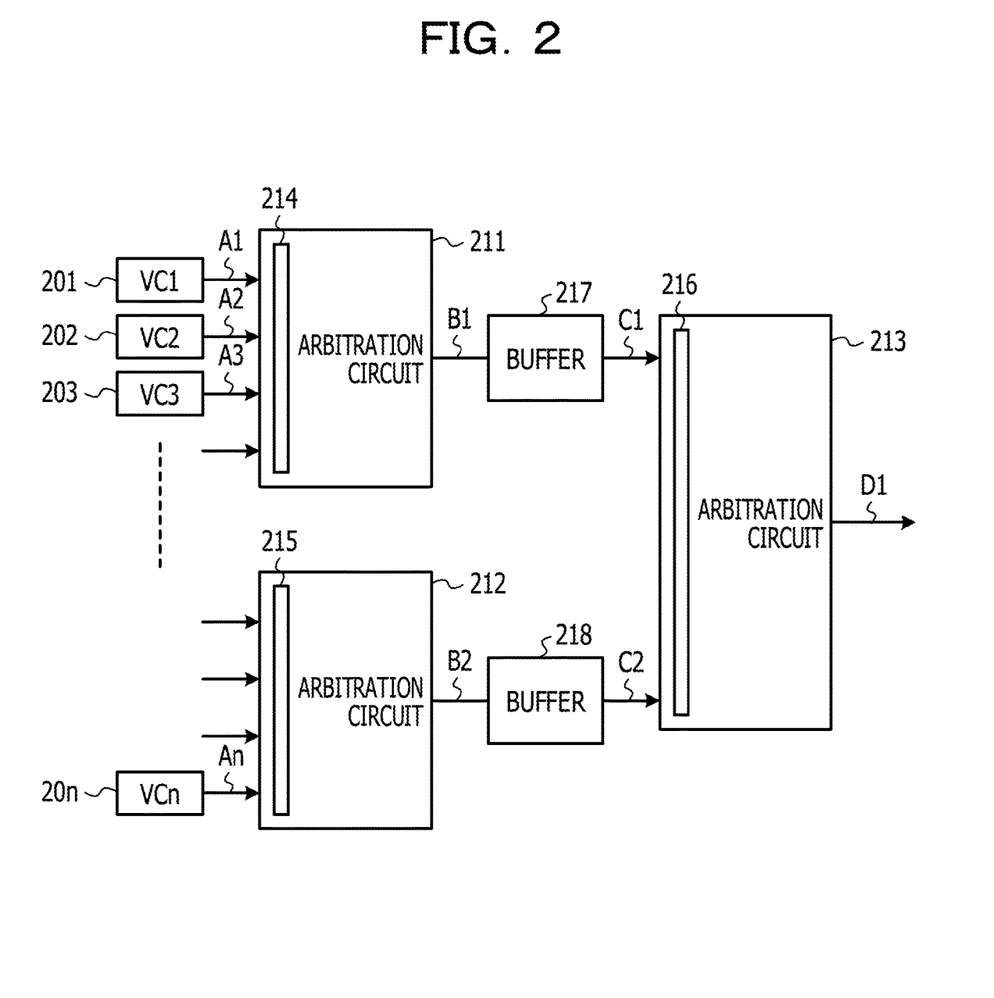
FIG. 2 illustrates an example of a bus control circuit illustrated in FIG. 1.

FIG. 2 illustrates an example of a bus control circuit illustrated in FIG. 1. The bus control circuit 104 includes a plurality of queues 201 to 20$n$, a plurality of first arbitration circuits 211 and 212, a plurality of buffers 217 and 218, and a second arbitration circuit 213.

The processor 102 stores packet data of a first virtual channel VC1 to an n-th virtual channel VCn in n queues 201 to 20$n$, respectively. Each of the n queues 201 to 20$n$ stores packet data on a First in, First out (FIFO) basis. For example, the first queue 201 stores the packet data of the first virtual channel VC1. The second queue 202 stores the packet data of the second virtual channel VC2. The n-th queue 20$n$ stores the packet data of the n-th virtual channel VCn. In the case where each of the queues 201 to 20n stores packet data, the queues 201 to 20n output respective arbitration participation signals A1 to An including individual virtual channel numbers.

The plurality of first arbitration circuits 211 and 212 receive, in a divided manner, the arbitration participation signals A1 to An from the plurality of queues 201 to 20n, respectively. Each of the plurality of first arbitration circuits 211 and 212 arbitrates the received plurality of arbitration participation signals, and outputs one of the received plurality of arbitration participation signals.

For example, the first arbitration circuit 211 arbitrates the arbitration participation signals A1 to Am (m=n/2), and outputs an arbitration participation signal B1 among the received plurality of arbitration participation signals A1 to Am to the buffer 217. For example, the first arbitration circuit 211 performs arbitration in a least recently used (LRU) method, using an LRU flag 214. The LRU flag 214 is a flag for indicating the oldest arbitration participation signal among the arbitration participation signals A1 to Am. The first arbitration circuit 211 outputs, using the LRU flag 214, the oldest arbitration participation signal B1 among the plurality of arbitration participation signals A1 to Am to the buffer 217.

The first arbitration circuit 212 arbitrates the arbitration participation signals Am+1 to An, and outputs an arbitration participation signal B2 among the received plurality of arbitration participation signals Am+1 to An to the buffer 218. Specifically, the first arbitration circuit 212 performs arbitration in the LRU method using an LRU flag 215. The LRU flag 215 is a flag for indicating the oldest arbitration participation signal among the arbitration participation signals Am+1 to An. The first arbitration circuit 212 outputs, using the LRU flag 215, the oldest arbitration participation signal B2 among the plurality of arbitration participation signals Am+1 to An to the buffer 218. The number of first arbitration circuits is not limited to two. Three or more first arbitration circuits may be provided.

The buffers 217 and 218 store, on the First in, First Out basis, the arbitration participation signals B1 and B2 output from the first arbitration circuits 211 and 212, respectively. The buffer 217 stores, on the First in, First out basis, the arbitration participation signal B1 output from the first arbitration circuit 211, and outputs the stored arbitration participation signal as an arbitration participation signal C1 to the second arbitration circuit 213. The buffer 218 stores, on the First in, First out basis, the arbitration participation signal B2 output from the first arbitration circuit 212, and outputs the stored arbitration participation signal as an arbitration participation signal C2 to the second arbitration circuit 213. As with the first arbitration circuits, the number of buffers is not limited to two. Three or more buffers may be provided.

The second arbitration circuit 213 arbitrates arbitration participation signals C1 and C2 output from the buffers 217 and 218, respectively, and thus outputs an arbitration result signal D1 indicating one of the queues 201 to 20n. For example, the second arbitration circuit 213 performs arbitration in the LRU method using an LRU flag 216. The LRU flag 216 is a flag for indicating the oldest arbitration participation signal among the arbitration participation signals C1 and C2. The second arbitration circuit 213 outputs, using the LRU flag 216, the arbitration result signal D1 indicating a que corresponding to a virtual channel number included in the oldest arbitration participation signal among the plurality of arbitration participation signals C1 and C2. The queue indicated by the arbitration result signal D1 among the plurality of queues 201 to 20n acquires the right to use the bus 105, and reads stored packet data to the bus 105.

In the case where the second arbitration circuit 213 outputs the arbitration result signal D1, when each of the queues 201 to 20n store packet data, the queues 201 to 20n output the respective arbitration participation signals A1 to An including individual virtual channel numbers again, and repeat the above-described processing.

For example, in the case where n buses 105 are provided for n virtual channels VC1 to VCn, existence of the large number of buses 105 makes mounting and wiring difficult. Providing the arbitration circuits 211 to 213 has an advantage in being able to transfer packet data of the plurality of virtual channels VC1 to VCn by using a physically single shared bus 105. Furthermore, the bus control circuit 104 may transfer packet data equally to the plurality of virtual channels VC1 to VCn without bias by that the arbitration circuits 211 to 213 perform arbitration in the LRU method.

Figure 3A:
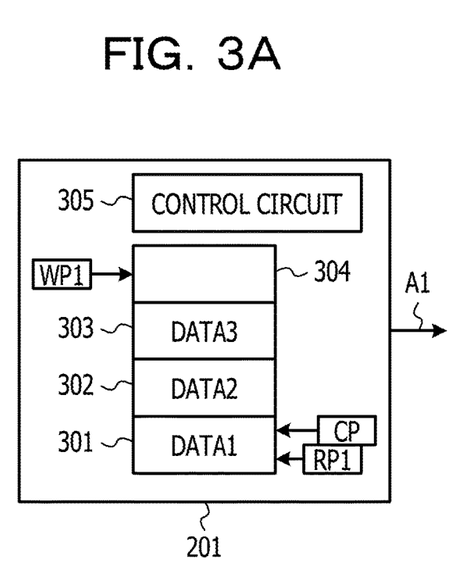
FIG. 3A illustrates an example of a first queue.

FIG. 3A illustrates an example of the first queue 201. The other queues 202 to 20n have configurations similar to that of the first queue 201. The first queue 201 includes a plurality of entries 301 to 304 for storing packet data, a control circuit 305, a first write pointer WP1, a first read pointer RP1, and a check pointer CP. At default, the control circuit 305 sets the first write pointer WP1 and the first read pointer RP1 to indicate the same entry 301, and sets the check pointer CP to indicate the same entry as the entry 301 indicated by the first read pointer RP1. For example, the first write pointer WP1, the first read pointer RP1, and the check pointer CP indicate the same entry 301.

When the first queue 201 receives packet data DATA1 from the processor 102, the control circuit 305 stores the packet data DATA1 in the entry 301 indicated by the first write pointer WP1. Then, the control circuit 305 updates the first write pointer WP1 so that the first write pointer WP1 indicates the next entry 302.

When the first queue 201 receives packet data DATA2 from the processor 102, the control circuit 305 stores the packet data DATA2 in the entry 302 indicated by the first write pointer WP1. The control circuit 305 updates the first write pointer WP1 so that the first write pointer WP1 indicates the next entry 303.

When the first queue 201 receives packet data DATA3 from the processor 102, the control circuit 305 stores the packet data DATA3 in the entry 303 indicated by the first write pointer WP1. The control circuit 305 updates the first write pointer WP1 so that the first write pointer WP1 indicates the next entry 304.

Figure 3B:
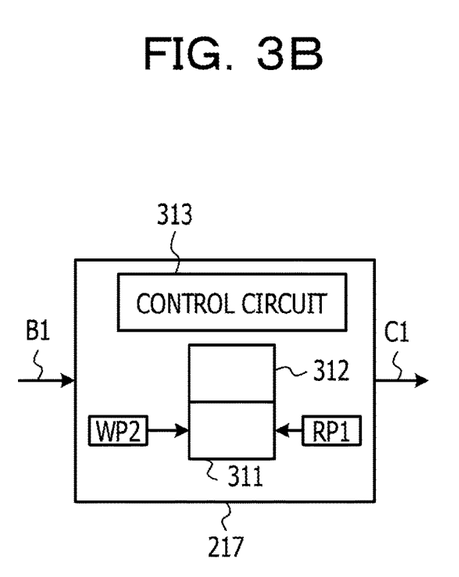
FIG. 3B illustrates an example of a buffer.

FIG. 3B illustrates an example of a buffer. The other buffer 218 has a configuration similar to that of the buffer 217. The buffer 217 includes a plurality of entries 311 and 312 for storing the arbitration participation signal B1, a control circuit 313, a second write pointer WP2, and a second read pointer RP2, and stores the arbitration participation signal B1 on the First in, First out basis. At default, the control circuit 313 sets the second write pointer WP2 and the second read pointer RP2 so that the second write pointer WP2 and the second read pointer RP2 indicate the same entry 311. For example, the control circuit 313 sets the second read pointer RP2 to indicate the same entry as the entry 311 indicated by the second write pointer WP2.

FIGS. 4A and 4B and FIGS. 5A and 5B each illustrate an example of an operation of a bus control circuit. FIG. 6 illustrates an example of a time chart illustrating an operation of a bus control circuit.

Figure 4A:
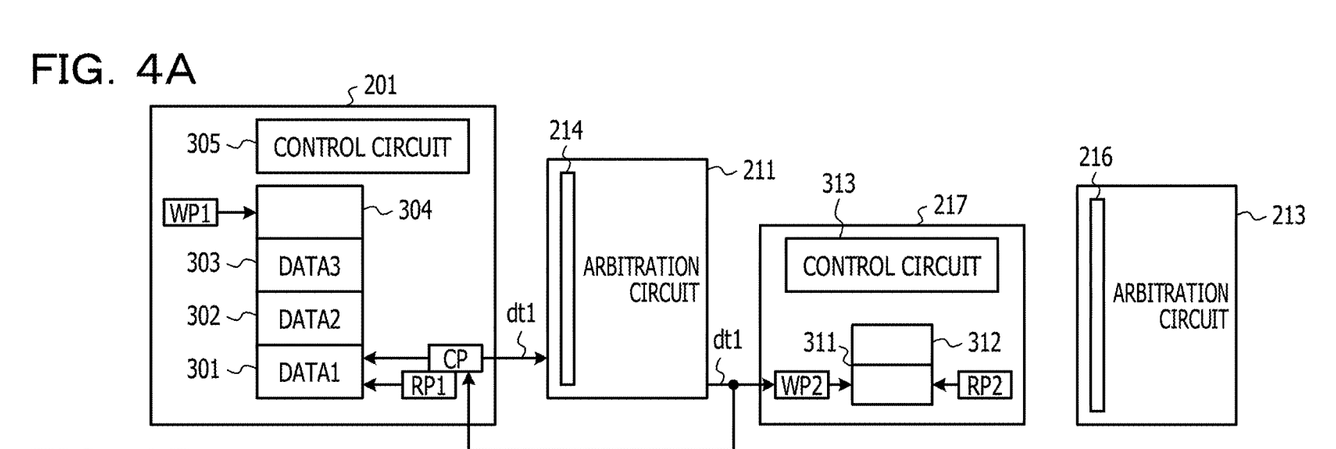
FIGS. 4A and 4B each illustrate an example of an operation of a bus control circuit.

As illustrated in FIG. 4A, a case where the first queue 201 stores the three packet data items: DATA1 to DATA3, and the other queues 202 to 20n do not store packet data will be explained. Also in the case where the packet data are stored only in the single queue 201 as described above, the first queue 201 rapidly reads the packet data DATA1 to DATA3.

For example, at cycle t1, the control circuit 305 determines whether or not packet data is stored in the entry 301 indicated by the check pointer CP. For example, in the case where the entry indicated by the check pointer CP is different from the entry indicated by the first write pointer WP1, the control circuit 305 determines that packet data is stored in the entry indicated by the check pointer CP. In contrast, in the case where the entry indicated by the check pointer CP is the same as the entry indicated by the first write pointer WP1, the control circuit 305 determines that no packet data is stored in the entry indicated by the check pointer CP.

As illustrated in FIG. 4A, in this case, the entry 301 indicated by the check pointer CP is different from the entry 304 indicated by the first write pointer WP1. Therefore, the control circuit 305 determines that the packet data DATA1 is stored in the entry 301 indicated by the check pointer CP. Thus, the control circuit 305 outputs a first arbitration participation signal dt1 including the channel number of the first virtual channel VC1 to the first arbitration circuit 211. The queues 202 to 20n do not store packet data, and therefore, do not output the arbitration participation signals A2 to An, respectively.

The first arbitration circuit 211 receives the first arbitration participation signal dt1 but does not receive the other arbitration participation signals A2 to An. Therefore, the first arbitration circuit 211 outputs the first arbitration participation signal dt1 to the buffer 217.

Figure 4B:
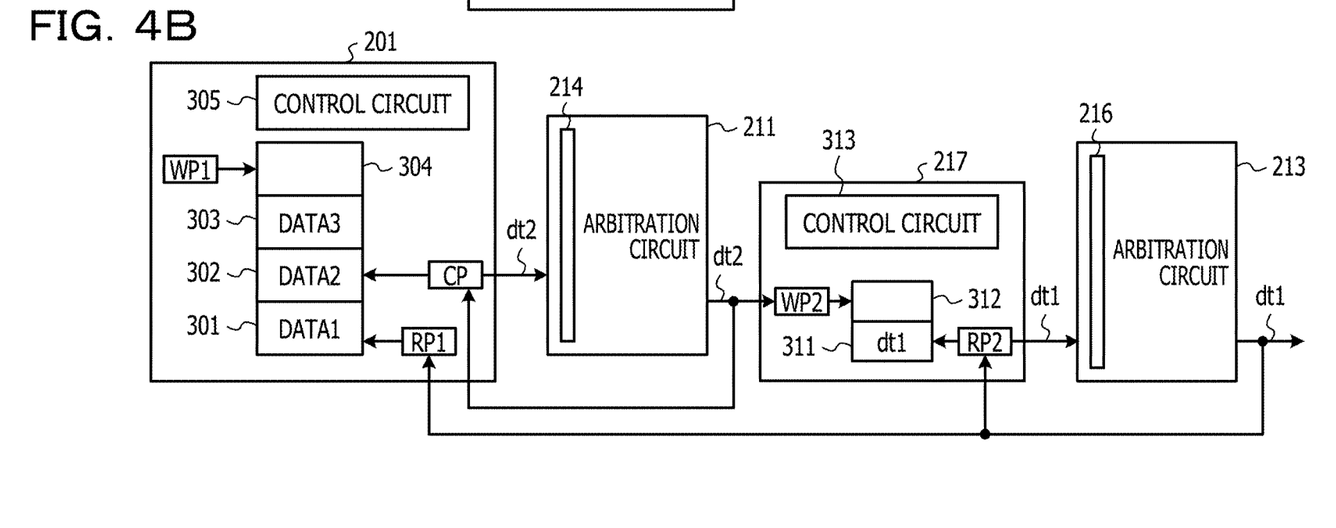

The control circuit 313 stores the first arbitration participation signal dt1 output from the first arbitration circuit 211 into the entry 311 indicated by the second write pointer WP2, and updates the second write pointer WP2 so that the second write pointer WP2 indicates the next entry 312, as illustrated in FIG. 4B. In the case where the first arbitration circuit 211 outputs the first arbitration participation signal dt1 as illustrated in FIG. 4A, the control circuit 305 updates the check pointer CP so that the check pointer CP indicates the next entry 302, as illustrated in FIG. 4B.

At cycle t2, the control circuit 305 determines whether or not packet data is stored in the entry 302 indicated by the check pointer CP. In this case, the entry 302 indicated by the check pointer CP is different from the entry 304 indicated by the first write pointer WP1. Therefore, the control circuit 305 determines that the packet data DATA2 is stored in the entry 302 indicated by the check pointer CP. Thus, the control circuit 305 outputs a second arbitration participation signal dt2 including the channel number of the first virtual channel VC1 to the first arbitration circuit 211. The queues 202 to 20n do not store packet data, and therefore, do not output the arbitration participation signals A2 to An, respectively.

The first arbitration circuit 211 receives the second arbitration participation signal dt2 but does not receive the other arbitration participation signals A2 to An. Therefore, the first arbitration circuit 211 outputs the second arbitration participation signal dt2 to the buffer 217.

The control circuit 313 determines whether or not an arbitration participation signal is stored in the entry 311 indicated by the second read pointer RP2. For example, in the case where the entry indicated by the second read pointer RP2 is different from the entry indicated by the second write pointer WP2, the control circuit 313 determines that an arbitration participation signal is stored in the entry indicated by the second read pointer RP2. In contrast, in the case where the entry indicated by the second read pointer RP2 is the same as the entry indicated by the second write pointer WP2, the control circuit 313 determines that no arbitration participation signal is stored in the entry indicated by the second read pointer RP2.

As illustrated in FIG. 4B, in this case, the entry 311 indicated by the second read pointer RP2 is different from the entry 312 indicated by the second write pointer WP2. Therefore, the control circuit 313 determines that the first arbitration participation signal dt1 is stored in the entry 311 indicated by the second read pointer RP2. Thus, the control circuit 313 reads the first arbitration participation signal dt1 stored in the entry 311 indicated by the second read pointer RP2, and outputs the read first arbitration participation signal dt1 to the second arbitration circuit 213. The buffer 218 does not store any arbitration participation signal, and therefore, does not output the arbitration participation signal C2.

The second arbitration circuit 213 receives the first arbitration participation signal dt1 but does not receive the other arbitration participation signal C2, and therefore, outputs an arbitration result signal indicating the first queue 201 (the first virtual channel VC1) corresponding to the first arbitration participation signal dt1.

In the case where the second arbitration circuit 213 outputs an arbitration result signal indicating the first queue 201 corresponding to the first arbitration participation signal dt1, the second arbitration circuit 213 updates the LRU flag 216 so that the arbitration participation signal for the first queue 201 represents the latest signal. In a similar manner, in the case where the second arbitration circuit 213 outputs an arbitration result signal indicating the first queue 201 corresponding to the first arbitration participation signal dt1, the first arbitration circuit 211 updates the LRU flag 214 so that the arbitration participation signal for the first queue 201 represents the latest signal.

Figure 5A:
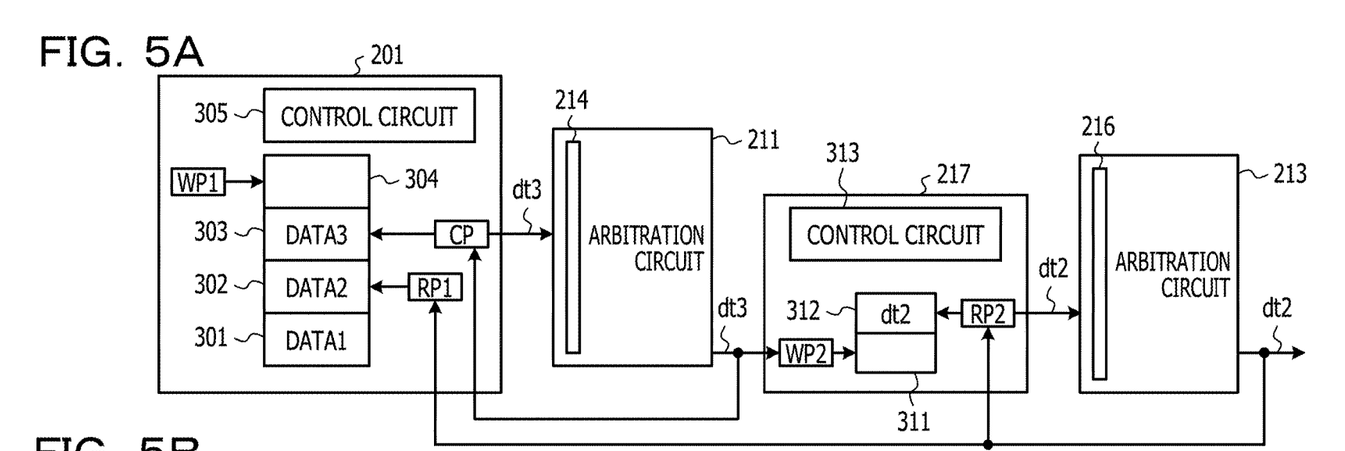
FIGS. 5A and 5B each illustrate an example of an operation of a bus control circuit.
Figure 6:
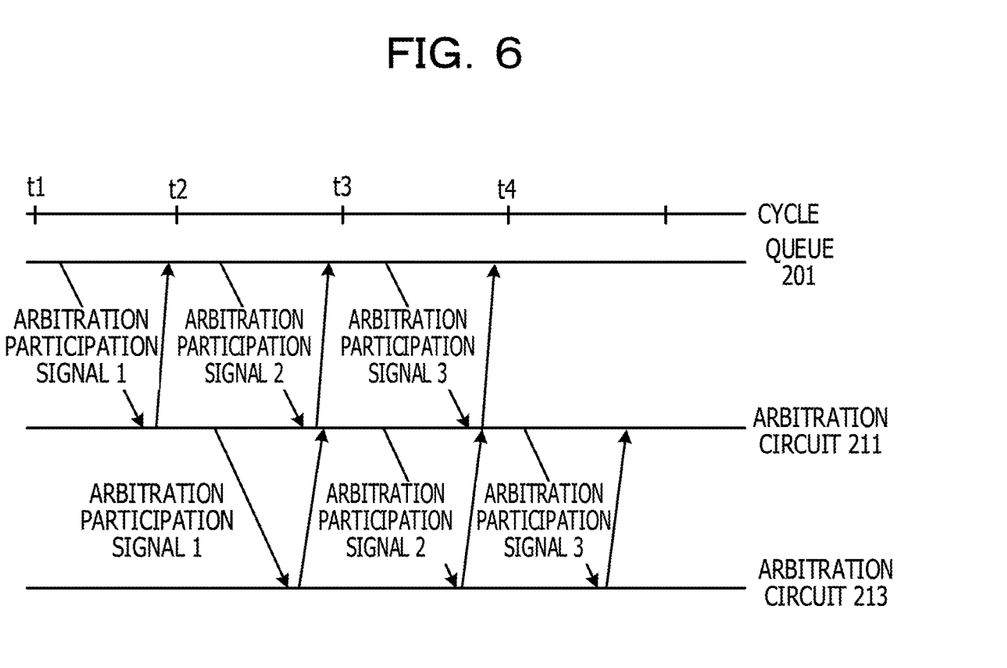
FIG. 6 illustrates an example of a time chart illustrating an operation of a bus control circuit.

In the case where the second arbitration circuit 213 outputs an arbitration result signal indicating the first queue 201 corresponding to the first arbitration participation signal dt1, the control circuit 313 updates the second read pointer RP2 so that the second read pointer RP2 indicates the next entry 312, as illustrated in FIG. 5A.

In the case where the second arbitration circuit 213 outputs an arbitration result signal indicating the first queue 201 corresponding to the first arbitration participation signal dt1, as illustrated in FIG. 4B, the control circuit 305 of the first queue 201 acquires the right to use the bus 105, and reads the packet data DATA1 of the entry 301 indicated by the first read pointer RP1 to the bus 105. The control circuit 305 updates the first read pointer RP1 so that the first read pointer RP1 indicates the next entry 302, as illustrated in FIG. 5A.

As illustrated in FIGS. 4B and 5A, the control circuit 313 stores the second arbitration participation signal dt2 output from the first arbitration circuit 211 into the entry 312 indicated by the second write pointer WP2, and updates the second write pointer WP2 so that the second write pointer WP2 indicates the next entry 311. In the case where the first arbitration circuit 211 outputs the second arbitration participation signal dt2, as illustrated in FIG. 4B, the control circuit 305 updates the check pointer CP so that the check pointer CP indicates the next entry 303, as illustrated in FIG. 5A.

At cycle t3, as illustrated in FIG. 5A, the control circuit 305 determines whether or not packet data is stored in the entry 303 indicated by the check pointer CP. In this case, the entry 303 indicated by the check pointer CP is different from the entry 304 indicated by the first write pointer WP1. Therefore, the control circuit 305 determines that the packet data DATA3 is stored in the entry 303 indicated by the check pointer CP. Thus, the control circuit 305 outputs a third arbitration participation signal dt3 including the channel number of the first virtual channel VC1 to the first arbitration circuit 211. The queues 202 to 20n do not store packet data, and therefore, do not output the arbitration participation signals A2 to An, respectively.

The first arbitration circuit 211 receives the third arbitration participation signal dt3 but does not receive the other arbitration participation signals A2 to An. Therefore, the first arbitration circuit 211 outputs the third arbitration participation signal dt3 to the buffer 217.

The control circuit 313 determines whether or not an arbitration participation signal is stored in the entry 312 indicated by the second read pointer RP2. In this case, the entry 312 indicated by the second read pointer RP2 is different from the entry 311 indicated by the second write pointer WP2. Therefore, the control circuit 313 determines that the second arbitration participation signal dt2 is stored in the entry 312 indicated by the second read pointer RP2. Thus, the control circuit 313 reads the second arbitration participation signal dt2 stored in the entry 312 indicated by the second read pointer RP2, and outputs the read second arbitration participation signal dt2 to the second arbitration circuit 213. The buffer 218 does not store any arbitration participation signal, and therefore, does not output the arbitration participation signal C2.

The second arbitration circuit 213 receives the second arbitration participation signal dt2 but does not receive the other arbitration participation signal C2. Therefore, the second arbitration circuit 213 outputs an arbitration result signal indicating the first queue 201 (the first virtual channel VC1) corresponding to the second arbitration participation signal dt2.

In the case where the second arbitration circuit 213 outputs an arbitration result signal indicating the first queue 201 corresponding to the second arbitration participation signal dt2, the second arbitration circuit 213 updates the LRU flag 216 so that the arbitration participation signal for the first queue 201 represents the latest signal. In a similar manner, in the case where the second arbitration circuit 213 outputs an arbitration result signal indicating the first queue 201 corresponding to the second arbitration participation signal dt2, the first arbitration circuit 211 updates the LRU flag 214 so that the arbitration participation signal for the first queue 201 represents the latest signal.

Figure 5B:
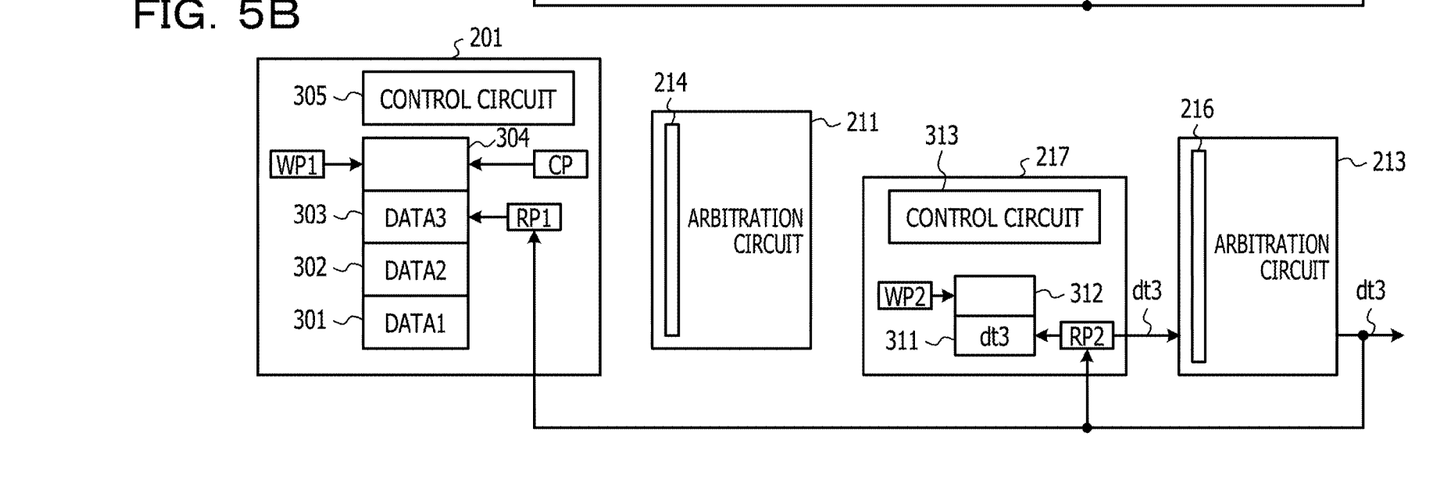

In the case where the second arbitration circuit 213 outputs an arbitration result signal indicating the first queue 201 corresponding to the second arbitration participation signal dt2, the control circuit 313 updates the second read pointer RP2 so that the second read pointer RP2 indicates the next entry 311, as illustrated in FIG. 5B.

In the case where the second arbitration circuit 213 outputs an arbitration result signal indicating the first queue 201 corresponding to the second arbitration participation signal dt2, as illustrated in FIG. 5A, the control circuit 305 of the first queue 201 acquires the right to use the bus 105, and reads the packet data DATA2 of the entry 302 indicated by the first read pointer RP1 to the bus 105. As illustrated in FIG. 5B, the control circuit 305 updates the first read pointer RP1 so that the first read pointer RP1 indicates the next entry 303.

The control circuit 313 stores the third arbitration participation signal dt3 output from the first arbitration circuit 211 into the entry 311 indicated by the second write pointer WP2, as illustrated in FIGS. 5A and 5B, and updates the second write pointer WP2 so that the second write pointer WP2 indicates the next entry 312. In the case where the first arbitration circuit 211 outputs the third arbitration participation signal dt3, as illustrated in FIG. 5A, the control circuit 305 updates the check pointer CP so that the check pointer CP indicates the next entry 304, as illustrated in FIG. 5B.

At cycle t4, the control circuit 305 determines whether or not packet data is stored in the entry 304 indicated by the check pointer CP, as illustrated in FIG. 5B. In this case, the entry 304 indicated by the check pointer CP is the same as the entry 304 indicated by the first write pointer WP1. Therefore, the control circuit 305 determines that no packet data is stored in the entry 304 indicated by the check pointer CP. Thus, the control circuit 305 does not output any arbitration participation signal.

The control circuit 313 determines whether or not an arbitration participation signal is stored in the entry 311 indicated by the second read pointer RP2. In this case, the entry 311 indicated by the second read pointer RP2 is different from the entry 312 indicated by the second write pointer WP2. Therefore, the control circuit 313 determines that the third arbitration participation signal dt3 is stored in the entry 311 indicated by the second read pointer RP2. Thus, the control circuit 313 reads the third arbitration participation signal dt3 stored in the entry 311 indicated by the second read pointer RP2, and outputs the read third arbitration participation signal dt3 to the second arbitration circuit 213. The buffer 218 does not store any arbitration participation signal, and therefore, does not output the arbitration participation signal C2.

The second arbitration circuit 213 receives the third arbitration participation signal dt3 but does not receive the other arbitration participation signal C2, and therefore, outputs an arbitration result signal indicating the first queue 201 (the first virtual channel VC1) corresponding to the third arbitration participation signal dt3.

In the case where the second arbitration circuit 213 outputs an arbitration result signal indicating the first queue 201 corresponding to the third arbitration participation signal dt3, the second arbitration circuit 213 updates the LRU flag 216 so that the arbitration participation signal for the first queue 201 represents the latest signal. In a similar manner, in the case where the second arbitration circuit 213 outputs an arbitration result signal indicating the first queue 201 corresponding to the third arbitration participation signal dt3, the first arbitration circuit 211 updates the LRU flag 214 so that the arbitration participation signal for the first queue 201 represents the latest signal.

In the case where the second arbitration circuit 213 outputs an arbitration result signal indicating the first queue 201 corresponding to the third arbitration participation signal dt3, the control circuit 313 updates the second read pointer RP2 so that the second read pointer RP2 indicates the next entry 312.

In the case where the second arbitration circuit 213 outputs an arbitration result signal indicating the first queue 201 corresponding to the third arbitration participation signal dt3, as illustrated in FIG. 5B, the control circuit 305 of the first queue 201 acquires the right to use the bus 105, and reads the packet data DATA3 of the entry 303 indicated by the first read pointer RP1 to the bus 105. The control circuit 305 updates the first read pointer RP1 so that the first read pointer RP1 indicates the next entry 304.

As illustrated in FIG. 6, at cycle t2, the second arbitration circuit 213 outputs an arbitration result signal corresponding to the first arbitration participation signal dt1, and the control circuit 305 receives the arbitration result signal and reads the packet data DATA1 of the entry 301 to the bus 105. At cycle t3, the second arbitration circuit 213 outputs an arbitration result signal corresponding to the second arbitration participation signal dt2, and the control circuit 305 receives the arbitration result signal and reads the packet data DATA2 of the entry 302 to the bus 105. At cycle t4, the second arbitration circuit 213 outputs an arbitration result signal corresponding to the third arbitration participation signal dt3, and the control circuit 305 receives the arbitration result signal and reads the packet data DATA3 of the entry 303 to the bus 105.

Before the second arbitration circuit 213 outputs an arbitration result signal indicating the first queue 201 corresponding to the first arbitration participation signal dt1, the control circuit 305 outputs the second arbitration participation signal dt2. In a similar manner, before the second arbitration circuit 213 outputs an arbitration result signal indicating the first queue 201 corresponding to the second arbitration participation signal dt2, the control circuit 305 outputs the third arbitration participation signal dt3.

As described above, the control circuit 305 reads the three packet data items: DATA1 to DATA3, at three cycles: t2 to t4, to the bus 105. For example, the control circuit 305 may read packet data at every cycle to the bus 105. With the provision of the check pointer CP, the bus control circuit 104 may read the packet data DATA1 to DATA3 continuously to the bus 105.

Figure 7A:
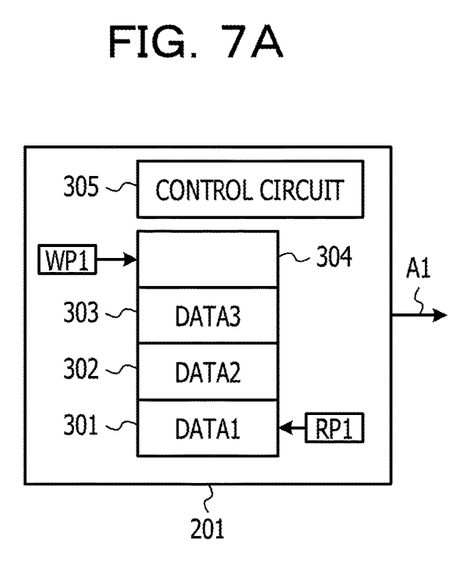
FIG. 7A illustrates an example of a first queue.

FIG. 7A illustrates an example of a first queue. The first queue 201 illustrated in FIG. 7A is different from the first queue 201 illustrated in FIG. 3A in that the check pointer CP is deleted.

Figure 7B:
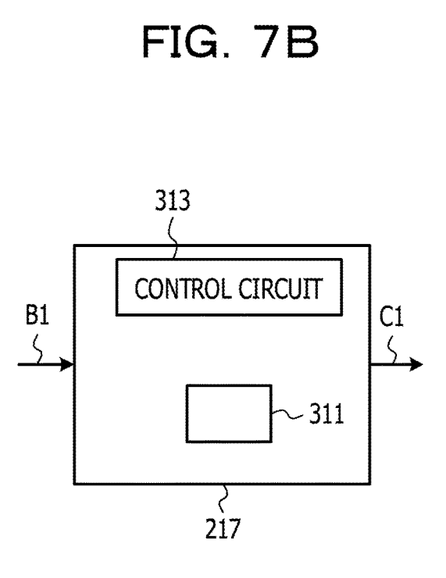
FIG. 7B illustrates an example of a buffer.

FIG. 7B illustrates an example of a buffer. The buffer 217 illustrated in FIG. 7B is different from the buffer 217 illustrated in FIG. 3B in that the entry 312, the second write pointer WP2, and the second read pointer RP2 are deleted.

Figure 8A:
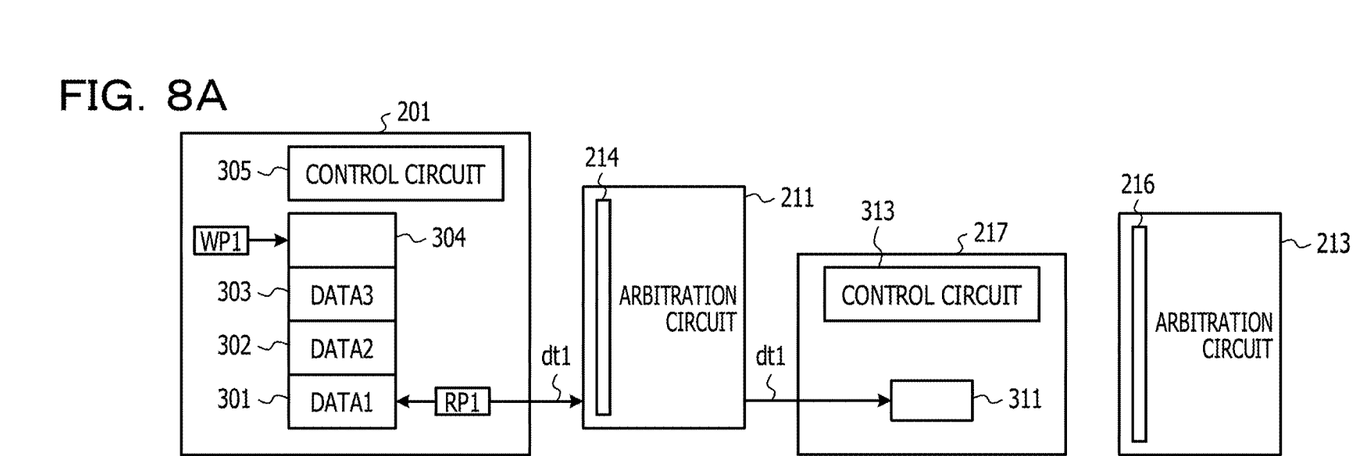
FIGS. 8A and 8B each illustrate an example of an operation of a bus control circuit.
Figure 8B:
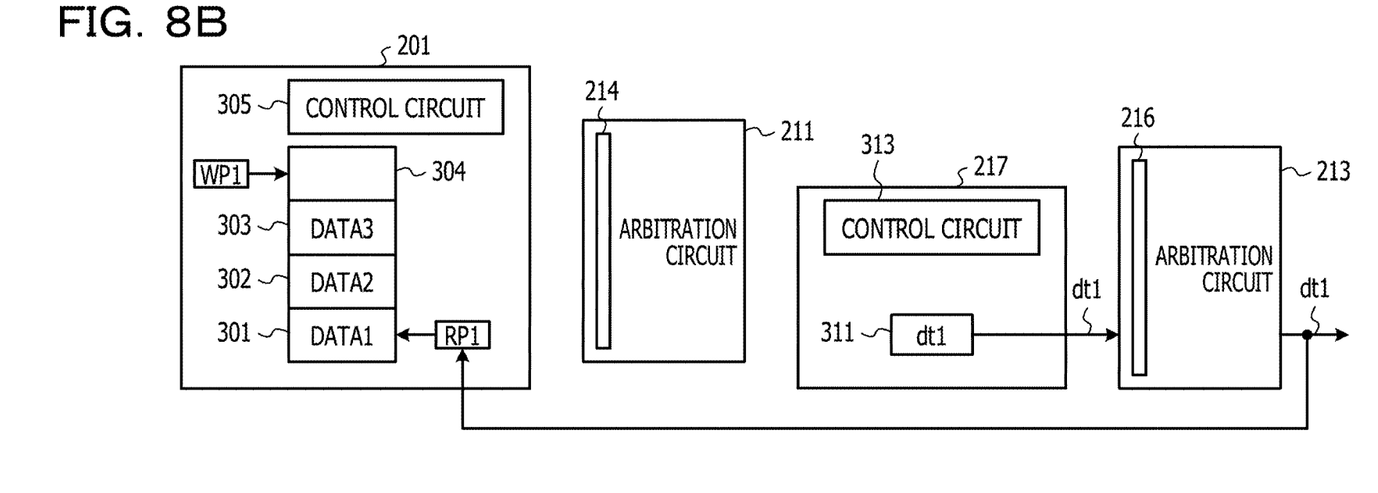
Figure 9A:
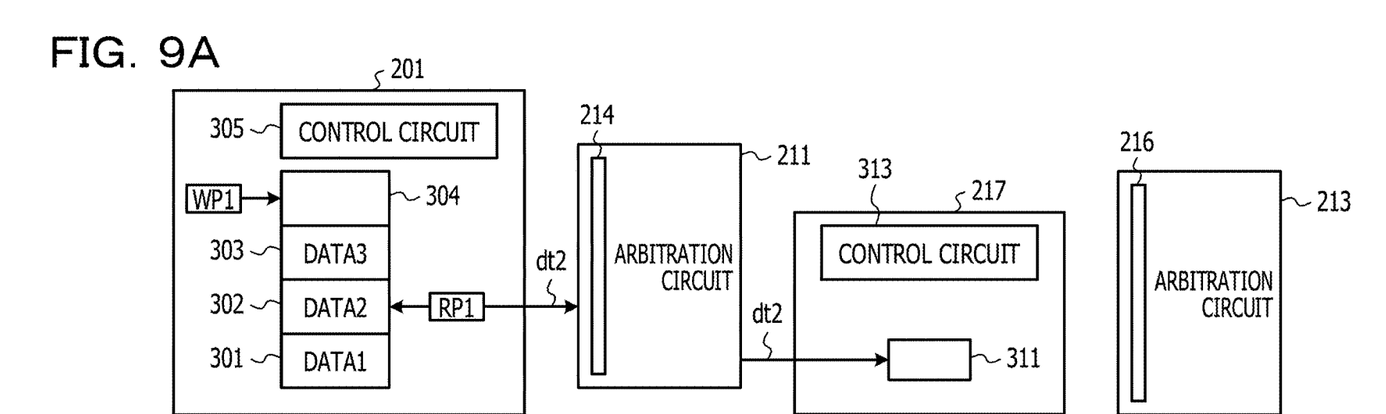
FIGS. 9A and 9B each illustrate an example of an operation of a bus control circuit.

FIGS. 8A and 8B and FIGS. 9A and 9B each illustrate an example of an operation of a bus control circuit. FIG. 10 illustrates an example of a time chart illustrating an operation of a bus control circuit.

As illustrated in FIG. 8A, the packet data DATA1 is stored in the entry 301 indicated by the first read pointer RP1, and therefore, at cycle t1, the control circuit 305 outputs the first arbitration participation signal dt1 to the first arbitration circuit 211. The first arbitration circuit 211 receives the first arbitration participation signal dt1 but does not receive the other arbitration participation signals A2 to An. Therefore, the first arbitration circuit 211 outputs the first arbitration participation signal dt1 to the buffer 217. The control circuit 313 stores the first arbitration participation signal dt1 output from the first arbitration circuit 211 into the entry 311, as illustrated in FIGS. 8A and 8B.

At cycle t2, the control circuit 313 reads the first arbitration participation signal dt1 stored in the entry 311, and outputs the read first arbitration participation signal dt1 to the second arbitration circuit 213, as illustrated in FIG. 8B.

The second arbitration circuit 213 receives the first arbitration participation signal dt1 but does not receive the other arbitration participation signal C2. Therefore, the second arbitration circuit 213 outputs an arbitration result signal indicating the first queue 201 (the first virtual channel VC1) corresponding to the first arbitration participation signal dt1.

In the case where the second arbitration circuit 213 outputs an arbitration result signal indicating the first queue 201 corresponding to the first arbitration participation signal dt1, the control circuit 305 of the first queue 201 reads the packet data DATA1 of the entry 301 indicated by the first read pointer RP1 to the bus 105. Then, the control circuit 305 updates the first read pointer RP1 so that the first read pointer RP1 indicates the next entry 302, as illustrated in FIG. 9A.

The packet data DATA2 is stored in the entry 302 indicated by the first read pointer RP1, and at cycle t3, the control circuit 305 outputs the second arbitration participation signal dt2 to the first arbitration circuit 211. The first arbitration circuit 211 receives the second arbitration participation signal dt2 but does not receive the other arbitration participation signals A2 to An. Therefore, the first arbitration circuit 211 outputs the second arbitration participation signal dt2 to the buffer 217. The control circuit 313 stores the second arbitration participation signal dt2 output from the first arbitration circuit 211 into the entry 311, as illustrated in FIGS. 9A and 9B.

Figure 9B:
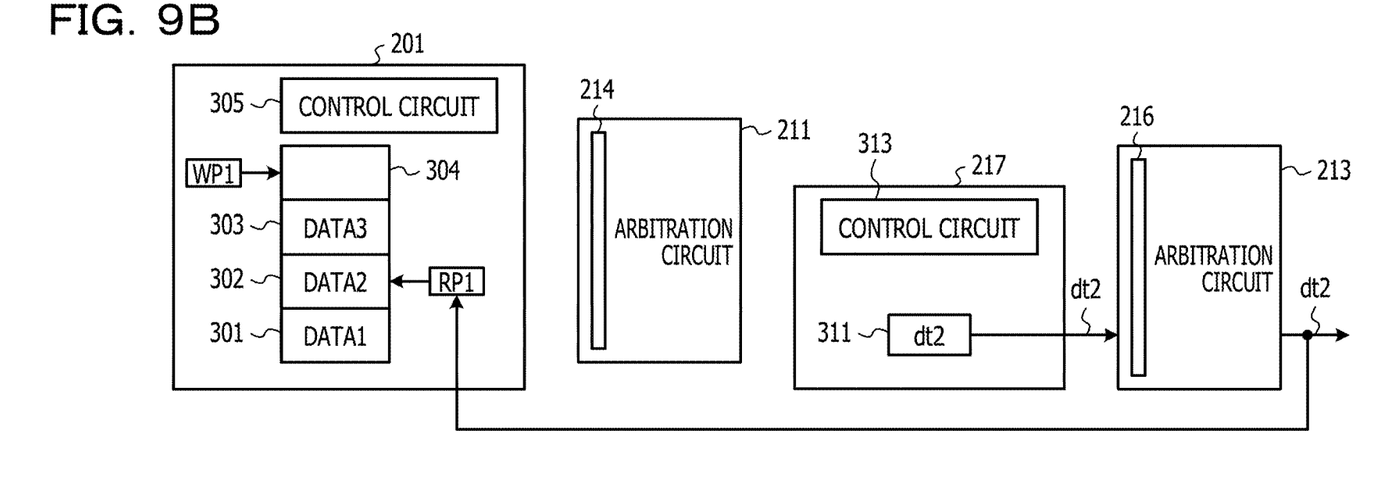
Figure 10:
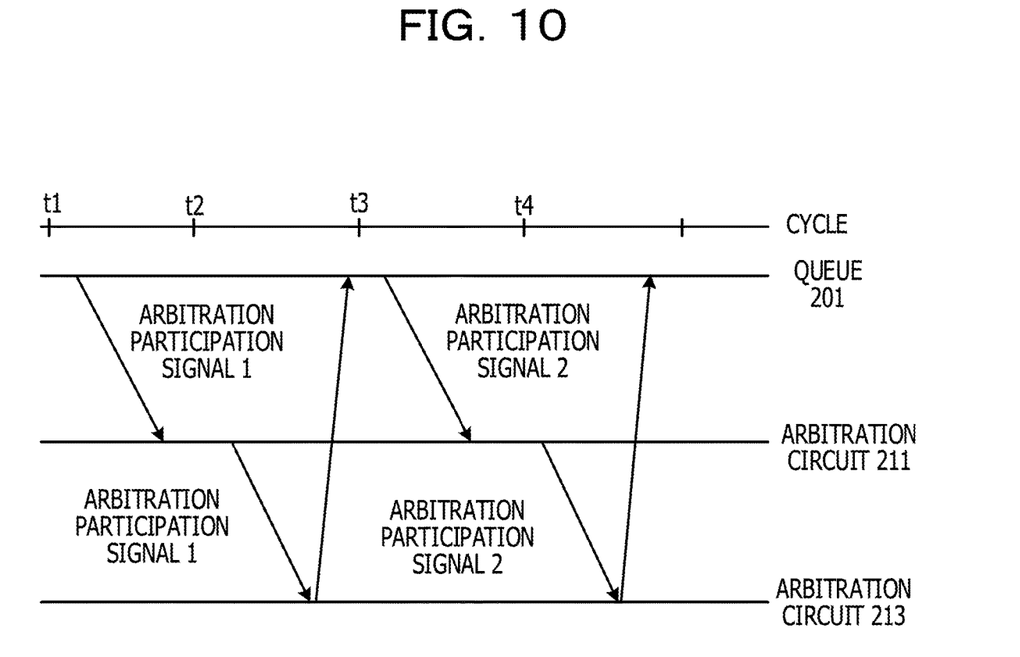
FIG. 10 illustrates an example of a time chart illustrating an operation of a bus control circuit.

At cycle t4, the control circuit 313 reads the second arbitration participation signal dt2 stored in the entry 311, and outputs the read second arbitration participation signal dt2 to the second arbitration circuit 213, as illustrated in FIG. 9B.

The second arbitration circuit 213 receives the second arbitration participation signal dt2 but does not receive the other arbitration result signal C2. Therefore, the second arbitration circuit 213 outputs an arbitration result signal indicating the first queue 201 (the first virtual channel VC1) corresponding to the second arbitration participation signal dt2.

In the case where the second arbitration circuit 213 outputs an arbitration result signal indicating the first queue 201 corresponding to the second arbitration participation signal dt2, the control circuit 305 of the first queue 201 reads the packet data DATA2 of the entry 302 indicated by the first read pointer RP1 to the bus 105.

As illustrated in FIG. 10, at cycle t2, the second arbitration circuit 213 outputs an arbitration result signal corresponding to the first arbitration participation signal dt1, and the control circuit 305 receives the arbitration participation signal and reads the packet data DATA1 of the entry 301 to the bus 105. At cycle t4, the second arbitration circuit 213 outputs an arbitration result signal corresponding to the second arbitration participation signal dt2, and the control circuit 305 receives the arbitration result signal and reads the packet data DATA2 of the entry 302 to the bus 105. After the second arbitration circuit 213 outputs an arbitration result signal indicating the first queue 201 corresponding to the first arbitration participation signal dt1, the control circuit 305 outputs the second arbitration participation signal dt2. As described above, the control circuit 305 reads packet data at every two cycles to the bus 105.

For example, the control circuit 305 illustrated in FIG. 3A reads packet data at every cycle to the bus 105. The control circuit 305 illustrated in FIG. 7A reads packet data to the bus 105 at double the speed of the control circuit 305 illustrated in FIG. 3A, and achieves double the throughput of the control circuit 305 illustrated in FIG. 3A. In the case where data is stored only in the first queue 201 among the plurality of queues 201 to 20n, the bus control circuit 104 rapidly reads the packet data stored in the first queue 201.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A bus control circuit comprising:
    a plurality of queues that store a plurality of arbitration participation signals on a First in, First out basis and each includes a plurality of entries for storing data, a first read pointer, and a check pointer;
    a plurality of first arbitration circuits, each coupled to corresponding queues which are included in the plurality of queues, that receive, in a divided manner, the arbitration participation signals from the plurality of queues, each performs first arbitration on outputted arbitration participation signals which are output from the corresponding queues, and each outputs one of the outputted arbitration participation signals which is obtained by the first arbitration;
    a plurality of buffers, coupled to the respective first arbitration circuits, that each stores, on the First in, First out basis, the corresponding one of the outputted arbitration participation signals output from the respective first arbitration circuits; and
    a second arbitration circuit, coupled to the plurality of buffers, that performs second arbitration on the one of the outputted arbitration participation signals output from the plurality of buffers and outputs, as an arbitration result signal, one arbitration participation signal which is obtained by the second arbitration and corresponds to one of the plurality of queues,
    the check pointer of each of the plurality of queues is updated based on the corresponding one of the outputted arbitration participation signals and the first read pointer of each of the plurality of queues is updated based on the arbitration result signal.

2. The bus control circuit according to claim 1, wherein in a case where data is stored in an entry indicated by the check pointer, a first queue among the plurality of queues outputs a first arbitration participation signal to the respective first arbitration circuits, the respective first arbitration circuits receive the first arbitration participation signal and output the first arbitration participation signal to the respective buffers, the respective buffers store the first arbitration participation signal output from the respective first arbitration circuits and output the stored first arbitration participation signal to the second arbitration circuit, the first queue, in a case where the respective first arbitration circuits output the first arbitration participation signal, updates the check pointer, and outputs, in a case where data is stored in an entry indicated by the updated check pointer, a second arbitration participation signal to the respective first arbitration circuits, the second arbitration circuit receives the first arbitration participation signal, and outputs an arbitration result signal indicating the first queue corresponding to the first arbitration participation signal, the respective first arbitration circuits receive the second arbitration participation signal and output the second arbitration participation signal to the respective buffers, the respective buffers store the second arbitration participation signal output from the respective first arbitration circuits and output the stored second arbitration participation signal to the second arbitration circuit, and the first queue, in a case where the second arbitration circuit outputs an arbitration result signal indicating the first queue corresponding to the first arbitration participation signal, reads data of the entry indicated by the first read pointer to a bus and updates the first read pointer, and the first queue, in a case where the respective first arbitration circuits output the second arbitration participation signal, updates the check pointer, and the first queue, in a case where data is stored in the entry indicated by the updated check pointer, outputs a third arbitration participation signal to the respective first arbitration circuits.

3. The bus control circuit according to claim 2, wherein each of the plurality of queues includes a first write pointer, and the first queue, in a case where an entry indicated by the check pointer is different from an entry indicated by the first write pointer, determines that data is stored in the entry indicated by the check pointer, and determines, in a case where the entry indicated by the check pointer is same as the entry indicated by the first write pointer, determines that no data is stored in the entry indicated by the check pointer.

4. The bus control circuit according to claim 3, wherein the queue, in a case where each of the plurality of queues receives data, stores the received data into the entry indicated by the first write pointer, and updates the first write pointer.

5. The bus control circuit according to claim 2, wherein each of the buffers includes a plurality of entries, a second write pointer and a second read pointer, sets the second read pointer to indicate the same entry as an entry indicated by the second write pointer, stores the first arbitration participation signal into the entry indicated by the second write pointer, updates the second write pointer, outputs the first arbitration participation signal stored in the entry indicated by the second read pointer to the second arbitration circuit, and updates, in a case where the second arbitration circuit outputs the arbitration result signal indicating the first queue corresponding to the first arbitration participation signal, the second read pointer.

6. The bus control circuit according to claim 2, wherein before the second arbitration circuit outputs the arbitration result signal indicating the first queue corresponding to the first arbitration participation signal, the first queue outputs the second arbitration participation signal.

7. The bus control circuit according to claim 2, wherein the second arbitration circuit receives the second arbitration participation signal, and outputs an arbitration result signal indicating the first queue corresponding to the second arbitration participation signal, the respective first arbitration circuit receive the third arbitration participation signal, and output the third arbitration participation signal to the respective buffers, the respective buffers store the third arbitration participation signal output from the respective first arbitration circuits, and output the stored third arbitration participation signal to the second arbitration circuit, and the first queue, in a case where the second arbitration circuit outputs the arbitration result signal indicating the first queue corresponding to the second arbitration participation signal, reads data of the entry indicated by the first read pointer to a bus and updates the first read pointer.

8. The bus control circuit according to claim 7, wherein the second arbitration circuit receives the third arbitration participation signal, and outputs an arbitration result signal indicating the first queue corresponding to the third arbitration participation signal, and the first queue, in a case where the second arbitration circuit outputs the arbitration result signal indicating the first queue corresponding to the third arbitration participation signal, reads the data of the entry indicated by the first read pointer to the bus and updates the first read pointer.

9. The bus control circuit according to claim 2, wherein in a case where the respective first arbitration circuits receive the first arbitration participation signal and do not receive other arbitration participation signals, the respective first arbitration circuits output the first arbitration participation signal to the respective buffers, and in a case where the second arbitration circuit receives the first arbitration participation signal and does not receive the other arbitration participation signals, the second arbitration circuit outputs the arbitration result signal indicating the first queue corresponding to the first arbitration participation signal.

10. The bus control circuit according to claim 1, wherein the first arbitration circuits and the second arbitration circuit perform arbitration in a least recently used method.

11. An information processing apparatus comprising:
a bus;
a plurality of arithmetic processing devices coupled with each other by the bus and each including a bus control circuit, wherein the bus control circuit includes:
a plurality of queues that store a plurality of arbitration participation signals on a First in, First out basis and each includes a plurality of entries for storing data, a first read pointer, and a check pointer;
a plurality of first arbitration circuits, each coupled to corresponding queues which are included in the plurality of queues, that receive, in a divided manner, the arbitration participation signals from the plurality of queues, each performs first arbitration on outputted arbitration participation signals which are output from the corresponding queues, and each outputs one of the outputted arbitration participation signals which is obtained by the first arbitration;
a plurality of buffers, coupled to the respective first arbitration circuits, that each stores, on the First in, First out basis, the corresponding one of the outputted arbitration participation signals output from the respective first arbitration circuits; and
a second arbitration circuit, coupled to the plurality of buffers, that performs second arbitration on the one of the outputted arbitration participation signals output from the plurality of buffers and outputs, as an arbitration result signal, one first arbitration participation signal which is obtained by the second arbitration and corresponds to one of the plurality of queues,
the check pointer of each of the plurality of queues is updated based on the corresponding one of the outputted arbitration participation signals and the first read pointer of each of the plurality of queues is updated based on the arbitration result signal.

12. The information processing apparatus according to claim 11, wherein in a case where data is stored in an entry indicated by the check pointer, a first queue among the plurality of queues outputs a first arbitration participation signal to the respective first arbitration circuits, the respective first arbitration circuits receive the first arbitration participation signal and output the first arbitration participation signal to the respective buffers, the respective buffers store the first arbitration participation signal output from the respective first arbitration circuits and output the stored first arbitration participation signal to the second arbitration circuit, the first queue, in a case where the respective first arbitration circuits output the first arbitration participation signal, updates the check pointer, and outputs, in a case where data is stored in an entry indicated by the updated check pointer, a second arbitration participation signal to the respective first arbitration circuits, the second arbitration circuit receives the first arbitration participation signal, and outputs an arbitration result signal indicating the first queue corresponding to the first arbitration participation signal, the respective first arbitration circuits receive the second arbitration participation signal and output the second arbitration participation signal to the respective buffers, the respective buffers store the second arbitration participation signal output from the respective first arbitration circuits and output the stored second arbitration participation signal to the second arbitration circuit, and the first queue, in a case where the second arbitration circuit outputs an arbitration result signal indicating the first queue corresponding to the first arbitration participation signal, reads data of the entry indicated by the first read pointer to a bus and updates the first read pointer, and the first queue, in a case where the respective first arbitration circuits output the second arbitration participation signal, updates the check pointer, and the first queue, in a case where data is stored in the entry indicated by the updated check pointer, outputs a third arbitration participation signal to the respective first arbitration circuits.

13. The information processing apparatus according to claim 12, wherein each of the plurality of queues includes a first write pointer, and the first queue, in a case where an entry indicated by the check pointer is different from an entry indicated by the first write pointer, determines that data is stored in the entry indicated by the check pointer, and determines, in a case where the entry indicated by the check pointer is same as the entry indicated by the first write pointer, determines that no data is stored in the entry indicated by the check pointer.

14. The information processing apparatus according to claim 12, wherein each of the buffers includes a plurality of entries, a second write pointer and a second read pointer, sets the second read pointer to indicate the same entry as an entry indicated by the second write pointer, stores the first arbitration participation signal into the entry indicated by the second write pointer, updates the second write pointer, outputs the first arbitration participation signal stored in the entry indicated by the second read pointer to the second arbitration circuit, and updates, in a case where the second arbitration circuit outputs the arbitration result signal indicating the first queue corresponding to the first arbitration participation signal, the second read pointer.

15. The information processing apparatus according to claim 12, wherein before the second arbitration circuit outputs the arbitration result signal indicating the first queue corresponding to the first arbitration participation signal, the first queue outputs the second arbitration participation signal.

16. The information processing apparatus according to claim 12, wherein the second arbitration circuit receives the second arbitration participation signal, and outputs an arbitration result signal indicating the first queue corresponding to the second arbitration participation signal, the respective first arbitration circuit receive the third arbitration participation signal, and output the third arbitration participation signal to the respective buffers, the respective buffers store the third arbitration participation signal output from the respective first arbitration circuits, and output the stored third arbitration participation signal to the second arbitration circuit, and the first queue, in a case where the second arbitration circuit outputs the arbitration result signal indicating the first queue corresponding to the second arbitration participation signal, reads data of the entry indicated by the first read pointer to a bus and updates the first read pointer.

17. The information processing apparatus according to claim 12, wherein in a case where the respective first arbitration circuits receive the first arbitration participation signal and do not receive other arbitration participation signals, the respective first arbitration circuits output the first arbitration participation signal to the respective buffers, and in a case where the second arbitration circuit receives the first arbitration participation signal and does not receive the other arbitration participation signals, the second arbitration circuit outputs the arbitration result signal indicating the first queue corresponding to the first arbitration participation signal.

18. The information processing apparatus according to claim 11, wherein the first arbitration circuits and the second arbitration circuit perform arbitration in a least recently used method.

19. A control method for a bus control circuit comprising:
receiving in a divided manner, by a plurality of first arbitration circuits, arbitration participation signals from a plurality of queues that store a plurality of arbitration participation signals on a First in, First out basis and each includes a plurality of entries for storing data, a first read pointer, and a check pointer, the plurality of first arbitration circuits each being coupled to corresponding queues which are included in the plurality of queues;

performing, by the respective first arbitration circuits, first arbitration on outputted arbitration participation signals which are output from the corresponding queues;

outputting, by the respective first arbitration circuits, one of the outputted arbitration participation signals, which is obtained by the first arbitration;

storing, by each of a plurality of buffers coupled to the respective first arbitration circuits, the corresponding one of the outputted arbitration participation signals output from the respective first arbitration circuits on the First in, First out basis; and performing, by a second arbitration circuit coupled to the plurality of buffers, second arbitration on the one of the outputted arbitration participation signals output from the plurality of buffers; and outputting, as an arbitration result signal, one first arbitration participation signal which is obtained by the second arbitration and corresponds to one of the plurality of queues, the check pointer of each of the plurality of queues is updated based on the corresponding one of the outputted arbitration participation signals and the first read pointer of each of the plurality of queues is updated based on the arbitration result signal.

* * * * *